(12) United States Patent
Chung et al.

(10) Patent No.: US 11,928,277 B2
(45) Date of Patent: Mar. 12, 2024

(54) DISPLAY APPARATUS

(71) Applicant: PEGATRON CORPORATION, Taipei (TW)

(72) Inventors: Pei-Chun Chung, Taipei (TW); Yi-Chun Wu, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 0 days.

(21) Appl. No.: 18/185,389

(22) Filed: Mar. 17, 2023

(65) Prior Publication Data

US 2023/0367409 A1 Nov. 16, 2023

(30) Foreign Application Priority Data

May 10, 2022 (TW) .................................. 111117529

(51) Int. Cl.
*G06F 3/041* (2006.01)

(52) U.S. Cl.
CPC .. *G06F 3/0412* (2013.01); *G06F 2203/04103* (2013.01)

(58) Field of Classification Search
CPC ...................... G06F 3/0412; G06F 2203/04103
See application file for complete search history.

(56) References Cited

U.S. PATENT DOCUMENTS

2023/0259234 A1\* 8/2023 Lin ....................... G06F 3/0412
345/174

FOREIGN PATENT DOCUMENTS

| TW | 201322211 | 6/2013 |
| TW | I573065 | 3/2017 |
| TW | 201737038 | 10/2017 |
| TW | I634372 | 9/2018 |

OTHER PUBLICATIONS

"Search Report of Europe Counterpart Application", dated Nov. 3, 2023, p. 1-p. 9.

\* cited by examiner

*Primary Examiner* — Deeprose Subedi
(74) *Attorney, Agent, or Firm* — J.C. Patents

(57) ABSTRACT

A display apparatus includes a first touch sensing layer, a second touch sensing layer, a reflective display panel, and multiple light sources. The second touch sensing layer is disposed between the first touch sensing layer and the reflective display panel. The light sources are disposed on a surface of the first touch sensing layer facing the second touch sensing layer. The lights emitted by the light sources enter the second touch sensing layer, and then are transmitted to the reflective display panel.

9 Claims, 5 Drawing Sheets

DISPLAY APPARATUS

CROSS-REFERENCE TO RELATED APPLICATION

This application claims the priority benefit of Taiwan application serial no. 111117529, filed on May 10, 2022. The entirety of the above-mentioned patent application is hereby incorporated by reference herein and made a part of this specification.

BACKGROUND

Technical Field

The disclosure relates to a display apparatus.

Description of Related Art

Generally, reflective displays need to be equipped with external light sources. When the ambient light source is insufficient, the external light sources may be turned on so that users can clearly see the contents displayed. An external light source typically guides lights onto the reflective display with microstructures on a light guide plate. The external light source is located on both sides of the light guide plate, and the light guide plate is located over the reflective display.

To enable a display apparatus to have a touch function, a touch film layer is pasted on the top of the light guide plate with an optical adhesive. In such a design, since the LED light source also needs to be connected to a circuit board or a flexible circuit board, the overall size of the display apparatus is increased with a thickness of the light guide plate and a thickness of a LED light source.

In addition, during the product assembling process, the light guide plate and the LED light source need to be manufactured and assembled separately. For panel factories or terminal system factories, the process is more cumbersome.

SUMMARY

The disclosure provides a display apparatus having a small thickness and a simpler manufacturing and assembling process.

An embodiment of the disclosure provides a display apparatus, including a first touch sensing layer, a second touch sensing layer, a reflective display panel, and multiple light sources. The second touch sensing layer is disposed between the first touch sensing layer and the reflective display panel. The light sources are disposed on a surface of the first touch sensing layer facing the second touch sensing layer. The lights emitted by the light sources enter the second touch sensing layer, and then are transmitted to the reflective display panel.

Based on the above, in the display apparatus according to an embodiment of the disclosure, the light sources are disposed on the surface of the first touch sensing layer facing the second touch sensing layer. Therefore, the display apparatus not only has a smaller thickness, but also has a simpler manufacturing and assembling process, and the cost is lower.

DESCRIPTION OF THE EMBODIMENTS

Figure 1:
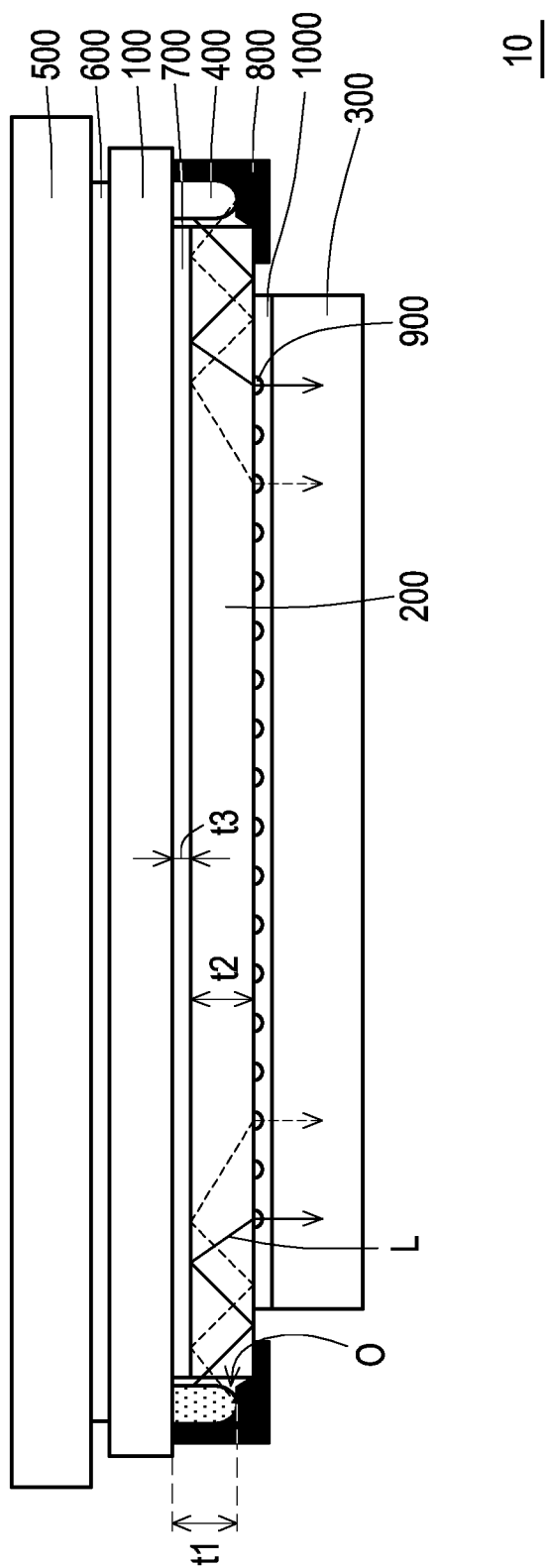
FIG. 1 is a schematic diagram illustrating a display apparatus according to the first embodiment of the disclosure.
Figure 2:
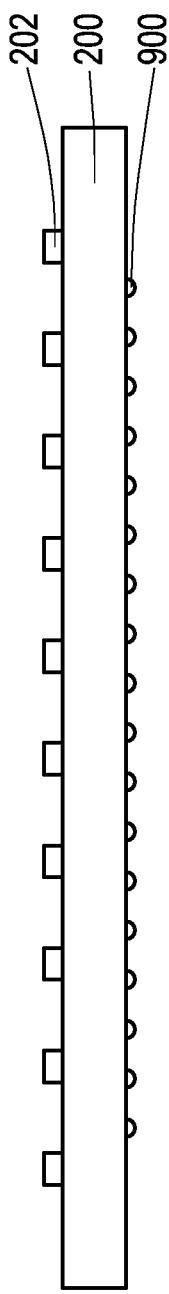
FIG. 2 is a schematic diagram illustrating a second touch sensing layer in FIG. 1.
Figure 3:
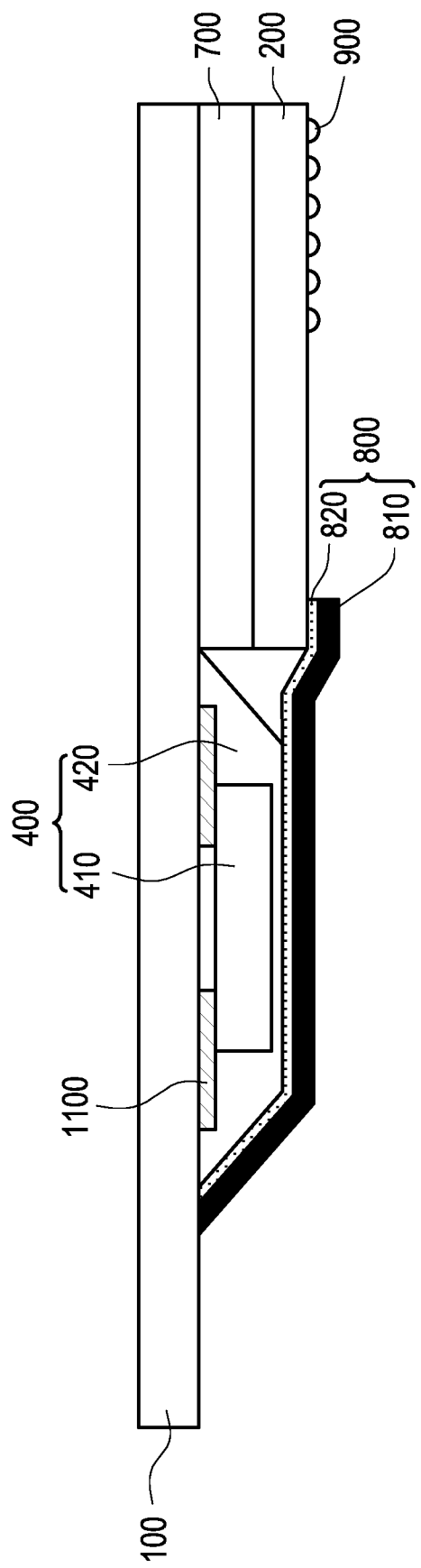
FIG. 3 is an enlarged schematic diagram illustrating a light source in FIG. 1.

FIG. 1 is a schematic diagram illustrating a display apparatus according to the first embodiment of the disclosure. FIG. 2 is a schematic diagram illustrating a second touch sensing layer in FIG. 1. FIG. 3 is an enlarged schematic diagram illustrating a light source in FIG. 1. Referring to FIGS. 1 to 3, an embodiment of the disclosure provides a display apparatus 10, including a first touch sensing layer 100, a second touch sensing layer 200, a reflective display panel 300, and multiple light sources 400. The second touch sensing layer 200 is disposed between the first touch sensing layer 100 and the reflective display panel 300. The light sources 400 are disposed on a surface of the first touch sensing layer 100 facing the second touch sensing layer 200. Lights L emitted by the light sources 400 enter the second touch sensing layer 200, and then are transmitted to the reflective display panel 300.

In detail, the first touch sensing layer 100 or the second touch sensing layer 200 of this embodiment may respectively be a film layer provided with multiple sensors (for example, sensors 202 shown in FIG. 2). A material of the film layer of the first touch sensing layer 100 or the second touch sensing layer 200 is, for example, polyethylene terephthalate (PET), polycarbonate (PC), cellulose triacetate (TAC), or polymethylmethacrylate (PMMA). Respectively through the sensors on the film layer, the first touch sensing layer 100 is configured to generate a first touch sensing signal, and the second touch sensing layer 200 is configured to generate a second touch sensing signal. In addition, the light sources 400 may include a light source chip 410 and a encapsulation body 420.

In this embodiment, the display apparatus 10 further includes a first optical adhesive layer 700 and a circuit layer 1100. The first optical adhesive layer 700 is disposed between the first touch sensing layer 100 and the second touch sensing layer 200. The circuit layer 1100 is disposed on a surface of the first touch sensing layer 100 facing the second touch sensing layer 200, and is disposed between the first touch sensing layer 100 and the light sources 400. The first optical adhesive layer 700 may be a thin film-like optical clear adhesive (OCA) or a liquid optical clear resin (OCR). The circuit layer 1100 is, for example, printed with Ag paste on the first touch sensing layer 100 to serve as a wire circuit of the light sources 400.

In this embodiment, the display apparatus 10 further includes multiple optical microstructures 900. The optical microstructures 900 are disposed on a surface of the second touch sensing layer 200 facing the reflective display panel 300. The optical microstructures 900 may be integrally formed with the second touch sensing layer 200 by imprinting, or formed on the second touch sensing layer 200 by spraying. In addition, the refractive index of the optical microstructures 900 is preferably less than or equal to the refractive index of the second touch sensing layer 200. Accordingly, when the lights L emitted by the light sources 400 enter the second touch sensing layer 200 and are transmitted in the second touch sensing layer 200 in a manner of total reflection, the optical microstructures 900 destroy the total reflection of the lights L, which allows the lights L to be transmitted to the reflective display panel 300.

In this embodiment, the display apparatus 10 further includes multiple reflectors 800. The reflectors 800 may include a reflective layer 810 and an adhesive layer 820, and the adhesive layer 820 is disposed between the reflective layer 810 and the light sources 400. The reflectors 800 are disposed on a surface of the first touch sensing layer 100 facing the second touch sensing layer 200, cover the light sources 400, and are extended on a surface of the second touch sensing layer 200 facing the reflective display panel 300. An opening O is formed between each reflector 800 and the first touch sensing layer 100, and faces the second touch sensing layer 200 (and the first optical adhesive layer 700). Since the display apparatus 10 is provided with the reflectors 800, the reflectors 800 not only allow the lights L emitted by the light sources 400 to be guided to the second touch sensing layer 200 as much as possible, but also help the lights L enter the second touch sensing layer 200 at a specific angle.

In this embodiment, the display apparatus 10 further includes a second optical adhesive layer 1000. The second optical adhesive layer 1000 is disposed between the second touch sensing layer 200 and the reflective display panel 300, and is disposed between the optical microstructures 900 and the reflective display panel 300. The second optical adhesive layer 1000 may be a thin film-like optical clear adhesive or a liquid optical clear resin. Moreover, the refractive index of the second optical adhesive layer 1000 is preferably less than or equal to the refractive index of the second touch sensing layer 200, which helps the lights L to be transmitted to the reflective display panel 300.

In this embodiment, the display apparatus 10 further includes a cover plate 500 and an optical adhesive layer 600. The optical adhesive layer 600 is disposed between the cover plate 500 and the first touch sensing layer 100. The cover plate 500 may be a piece of transparent glass or plastic. The optical adhesive layer 600 may be a thin film-like optical clear adhesive or a liquid optical clear resin.

Besides, in this embodiment, an area of the first touch sensing layer 100 is larger than an area of the second touch sensing layer 200. A range of an orthographic projection of the light sources 400 on the first touch sensing layer 100 and a range of an orthographic projection of the second touch sensing layer 200 on the first touch sensing layer 100 are not overlapped with each other. Moreover, in a direction from the first touch sensing layer 100 towards the second touch sensing layer 200, a thickness t1 of the light sources 400 is greater than a thickness t3 of the first optical adhesive layer 700, and the thickness t1 of the light sources 400 is less than or equal to the thickness t3 of the first optical adhesive layer 700 plus a thickness t2 of the second touch sensing layer 200. That is to say, such a design makes the light sources 400 generally located at a periphery of the second touch sensing layer 200, which allows the lights L to be directly guided to the second touch sensing layer 200.

TABLE 1

| Layer | Thickness (mm) |
| --- | --- |
| Optical adhesive layer 600 | 0.10 |
| First touch sensing layer 100 | 0.05 |
| First optical adhesive layer 700 | 0.05 |

TABLE 1-continued

| Layer | Thickness (mm) |
| --- | --- |
| Second touch sensing layer 200 | 0.05 |
| Second optical adhesive layer 1000 | 0.20 |

TABLE 2

| Layer | Thickness (mm) |
| --- | --- |
| Optical adhesive layer 600 | 0.10 |
| First touch sensing layer 100 | 0.125 |
| First optical adhesive layer 700 | 0.05 |
| Second touch sensing layer 200 | 0.125 |
| Second optical adhesive layer 1000 | 0.20 |

For example, Table 1 and Table 2 above exemplarily illustrate two designs of each film layer of the display apparatus 10. According to Table 1 and Table 2 above, when the thickness t1 of the light sources 400 falls between 0.05 mm and 0.15 mm, the display apparatus 10 of the embodiment of the disclosure can achieve the effect of the design. For example, the light sources 400 may be a mini light-emitting diode (Mini LED).

Based on the above, in the display apparatus 10 of an embodiment of the disclosure, the light sources 400 are disposed on the surface of the first touch sensing layer 100 facing the second touch sensing layer 200, which allows the lights L emitted by the light sources 400 to directly enter the second touch sensing layer 200 and then be transmitted to the reflective display panel 300. Therefore, compared to display apparatuses that need to use light guide plates, the display apparatus 10 of the embodiment of the disclosure not only has a smaller thickness, but also has a simpler manufacturing and assembling process, and the cost is lower.

Figure 4A:
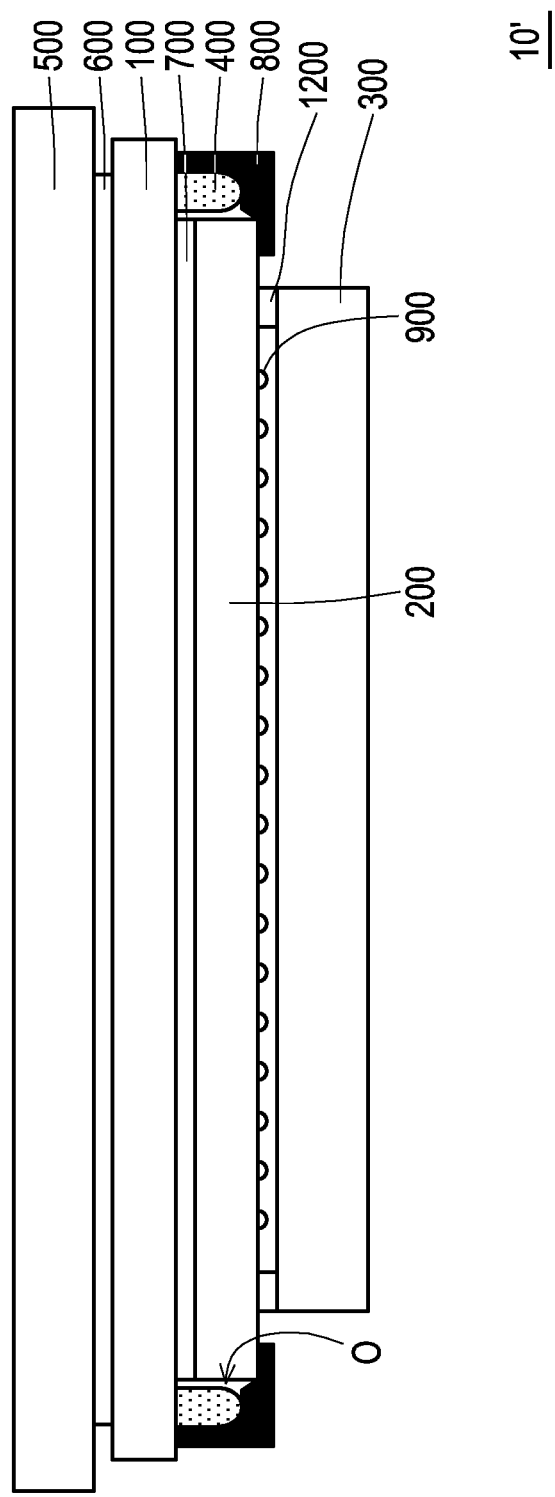
FIG. 4A is a schematic diagram illustrating a display apparatus according to the second embodiment of the disclosure.
Figure 4B:
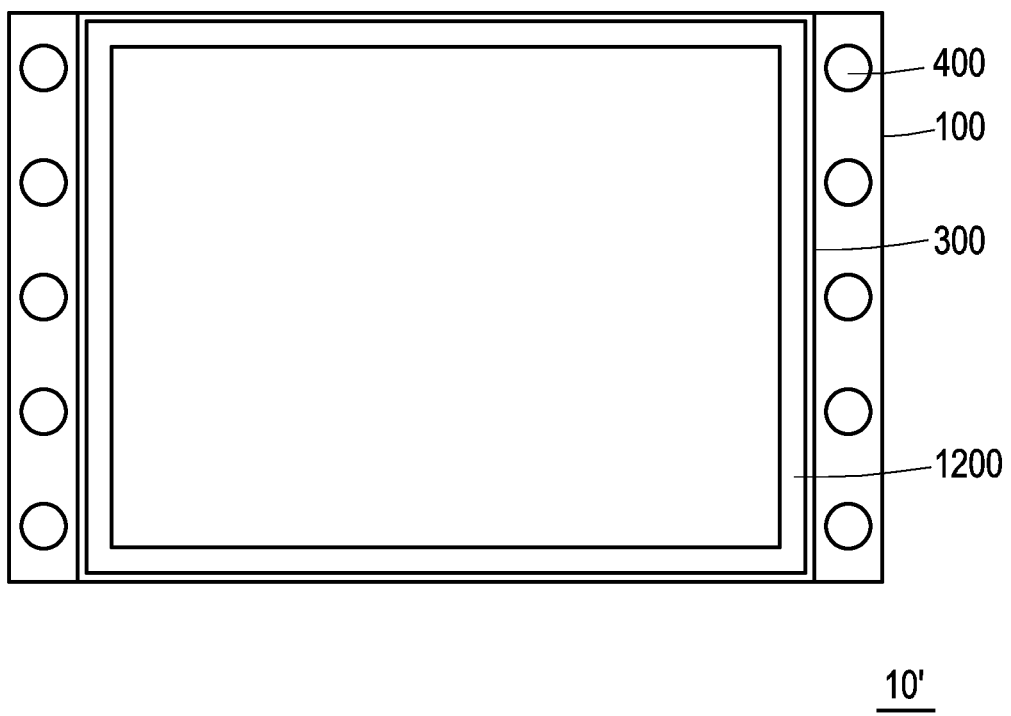
FIG. 4B is a top view of FIG. 4A.

FIG. 4A is a schematic diagram illustrating a display apparatus according to the second embodiment of the disclosure. FIG. 4B is a top view of FIG. 4A. Referring to FIGS. 4A and 4B, a display apparatus 10' is generally the same as the display apparatus 10 in FIG. 1. The main difference between the two is that the display apparatus 10' further includes a sealant 1200. The sealant 1200 is disposed between the second touch sensing layer 200 and the reflective display panel 300, and surrounds the optical microstructures 900. Therefore, disposing the sealant 1200 allows an air layer to exist between the second touch sensing layer 200 and the reflective display panel 300, which makes the effect of the lights L being guided from the second touch sensing layer 200 to the reflective display panel 300 better.

To sum up, in the display apparatus according to an embodiment of the disclosure, the light sources are designed to be on the surface of the first touch sensing layer facing the second touch sensing layer. Therefore, the display apparatus does not need a light guide plate for guiding lights, which makes the display apparatus not only have a smaller overall thickness, but also have a simpler manufacturing and assembling process, and the cost is lower.

What is claimed is:

1. A display apparatus, comprising:
   a first touch sensing layer;
   a second touch sensing layer;
   a reflective display panel, wherein the second touch sensing layer is disposed between the first touch sensing layer and the reflective display panel;
   a plurality of light sources disposed on a surface of the first touch sensing layer facing the second touch sensing layer, wherein lights emitted by the light sources enter the second touch sensing layer, and then are transmitted to the reflective display panel; and a plurality of reflectors disposed on the surface of the first touch sensing layer facing the second touch sensing layer, covering the light sources, and extending on a surface of the second touch sensing layer facing the reflective display panel, wherein an opening is formed between each of the reflectors and the first touch sensing layer, and faces the second touch sensing layer.

2. The display apparatus according to claim 1, further comprising:
   a first optical adhesive layer disposed between the first touch sensing layer and the second touch sensing layer; and
   a circuit layer disposed on a surface of the first touch sensing layer facing the second touch sensing layer, and disposed between the first touch sensing layer and the light sources.

3. The display apparatus according to claim 2, wherein in a direction from the first touch sensing layer towards the second touch sensing layer, a thickness of the light sources is greater than a thickness of the first optical adhesive layer.

4. The display apparatus according to claim 2, wherein in a direction from the first touch sensing layer towards the second touch sensing layer, a thickness of the light sources is less than or equal to a thickness of the first optical adhesive layer and the second touch sensing layer.

5. The display apparatus according to claim 1, further comprising:
   a plurality of optical microstructures disposed on a surface of the second touch sensing layer facing the reflective display panel.

6. The display apparatus according to claim 5, further comprising:
   a second optical adhesive layer disposed between the second touch sensing layer and the reflective display panel, and disposed between the optical microstructures and the reflective display panel.

7. The display apparatus according to claim 5, further comprising:
   a sealant disposed between the second touch sensing layer and the reflective display panel, and surrounding the optical microstructures.

8. The display apparatus according to claim 1, wherein an area of the first touch sensing layer is larger than an area of the second touch sensing layer.

9. The display apparatus according to claim 1, wherein a range of an orthographic projection of the light sources on the first touch sensing layer and a range of an orthographic projection of the second touch sensing layer on the first touch sensing layer are not overlapped with each other.

* * * * *